United States Patent [19]
Mohrman

[11] Patent Number: 5,794,417
[45] Date of Patent: Aug. 18, 1998

[54] VERSATILE CASE PACKING DEVICE

[75] Inventor: James A. Mohrman, Concord, N.C.

[73] Assignee: Philip Morris Incorporated, New York, N.Y.

[21] Appl. No.: 789,035

[22] Filed: Jan. 27, 1997

[51] Int. Cl.[6] ................................................ B65B 35/30
[52] U.S. Cl. ...................... 53/541; 53/168; 53/201; 53/496; 53/540
[58] Field of Search ........................ 53/168, 201, 540, 53/541, 496; 414/795.3, 900

[56] References Cited

U.S. PATENT DOCUMENTS

| | | | |
|---|---|---|---|
| 2,498,071 | 2/1950 | Dalziel et al. | 53/541 X |
| 2,869,297 | 1/1959 | Neer | 53/541 X |
| 2,956,381 | 10/1960 | Chauvin et al. . | |
| 3,022,615 | 2/1962 | Schroeder et al. . | |
| 3,041,803 | 7/1962 | Gamberini | 53/541 X |
| 3,477,198 | 11/1969 | Davis | 53/496 X |
| 3,584,432 | 6/1971 | Mayer | 53/496 |
| 3,765,145 | 10/1973 | Davis | 414/900 X |
| 3,954,165 | 5/1976 | Snyder | 53/541 X |
| 4,083,165 | 4/1978 | Maldina | 53/541 |
| 4,221,518 | 9/1980 | Cavazza . | |
| 4,509,310 | 4/1985 | Focke et al. . | |
| 4,631,900 | 12/1986 | Mattei et al. . | |
| 4,633,653 | 1/1987 | Roberts et al. | 53/498 |
| 4,679,379 | 7/1987 | Cassoli | 53/540 X |
| 4,711,065 | 12/1987 | Focke et al. . | |
| 4,819,407 | 4/1989 | Focke et al. . | |
| 4,830,170 | 5/1989 | Focke . | |
| 4,862,677 | 9/1989 | Roberts et al. . | |
| 4,928,817 | 5/1990 | Focke . | |
| 5,070,681 | 12/1991 | Romagnoli . | |
| 5,185,988 | 2/1993 | Cunningham | 53/541 X |
| 5,214,901 | 6/1993 | Milliner . | |
| 5,292,301 | 3/1994 | Focke . | |
| 5,353,815 | 10/1994 | Gamberini et al. . | |
| 5,358,104 | 10/1994 | Focke . | |
| 5,379,575 | 1/1995 | Focke et al. . | |
| 5,386,677 | 2/1995 | Kobuki et al. . | |
| 5,409,098 | 4/1995 | Focke et al. . | |
| 5,419,431 | 5/1995 | Neuber et al. . | |
| 5,473,862 | 12/1995 | Brizzi et al. . | |
| 5,509,525 | 4/1996 | Watanabe . | |

Primary Examiner—Daniel Moon
Attorney, Agent, or Firm—James T. Moore; James E. Schardt; Charles E. B. Glenn

[57] ABSTRACT

The present invention relates to an easily adjusted device for packing cartons or uniformly sized packages into a larger container for shipment. The device includes a telescoping stacking chamber with a telescoping base plate member having sensors for detecting a full layer, a raising means for lifting the telescoping base plate member, telescoping retaining clips for retaining a lifted layer, a sensor for determining when the stacking chamber is filled, a telescoping pushing plate assembly for ejecting the stack of cartons to a waiting case, and a telescoping outflow port. The apparatus may be mechanically individually adjusted in each of the foregoing aspects to accommodate cartons and cases of various sizes, or may be centrally controlled for adjustment by servomotors to preset measurements at the push of a button. A control device oversees operation of the entire unit.

20 Claims, 13 Drawing Sheets

VERSATILE CASE PACKING DEVICE

BACKGROUND OF THE INVENTION

High speed manufacturing processes often lack versatility. It is difficult to manufacture at high speeds then change over to manufacture different items, especially different sized items, also at high speeds. However, it is common knowledge that manufacturing processes are most efficient when operated at high speeds.

It is therefore desirable to have methods and devices for handling the output of high speed machinery in a versatile and flexible manner when that output differs in size or shape from run to run.

Field of the Invention

The present invention relates to case-packing machinery for inserting uniformly shaped packaged goods into a shipping container, or case. More particularly, this invention relates to machinery for packing cartons of cigarettes into cases.

A. Description of the Prior Art

It is known to insert packages of uniform dimensions into a box for shipping. Focke & Co of Germany, G.D. per Anzione of Italy, and other manufacturers make large pieces of equipment which are suitable for the task. They receive packages, such as cartons of cigarettes, generally brought by a conveyor means, stack or group them, and insert the stacks or groups into a box, often by action of hydraulic rams.

U.S. Pat. No. 5,379,575 describes an apparatus for introducing packs into a box. An intermediate container is used to fill boxes, with a plurality of packs arranged in rows above and next to one another. This intermediate container is formed from elongated compartments which are open at both ends and which receive one pack group each. The intermediate container is positioned in front of the open box in such a way that the contents can be pushed into the box in a single push-out cycle. A feed conveyor which serves for filling the intermediate containers feeds a pack string from a packaging machine to the intermediate container and directly introduces the pack string into the compartments.

U.S. Pat. No. 4,830,170 discloses a pack collecting and packaging station which adjusts for excess feed in the event of a packing interruption. In the event of a feed build-up, the drive connection between the articles and the pack conveyor is temporarily broken but the conveyor drive is maintained. A number of packs adjacent to the collecting and packaging station are lifted off from the pack conveyor until the fault is rectified and the transport of the packs can be continued.

A pack store is arranged in the region of the pack conveyor, which store receives the packs and returns them to the pack series after the interruption has ended. The pack store is designed as a vertical store which lifts each of the pack groups off the pack conveyor and conveys them upwards and then downwards into the pack series to return them.

Movable stops are assigned to the pack store and to the pack conveyor respectively and can be pivoted into the path of movement of the packs to halt the packs temporarily on the pack conveyor. Monitoring or sensing members are assigned to the stops and control the orderly introduction of the packs into the pack store and their return into the pack series on the pack conveyor.

U.S. Pat. No. 4,633,653 discloses an apparatus having a conveyor for moving a plurality of articles seriatim in a first direction to a location where means substantially perpendicular to the conveyer move a predetermined number of articles in the perpendicular direction into a case to form a layer within the case. Means are provided for vertically moving said case downwardly to receive subsequent layers in a similar fashion.

U.S. Pat. No. 3,765,145 discloses a case packing machine which fills an empty carton with a stack of cigarette cartons. The case packer is said to be capable of handling cartons of cigarettes of different lengths and thicknesses, and wherein it is not necessary first to turn the cartons over before they are fed into the case packing machine.

There is disclosed an input conveyor for moving cartons onto an elevator of the case packing apparatus, and the cartons move in a direction which is transverse to their long dimension and having their glued flaps on the upper sides thereof, means for moving the elevator upwardly when it is filled with cartons, means for holding the cartons on the input conveyor stationary during movement of the elevator, a magazine located above the elevator and positioned to receive the cartons from the elevator when the elevator is moved upwardly, the width dimensions of both the magazine and the elevator being adjustable in order to accommodate cartons of different widths and the height dimension of the magazine being adjustable in order to accommodate cartons of different heights, a loading platform, a tower for positioning an empty case on the platform and centering the case relative to a stack of cartons, the centering means being able to accommodate cases of different widths, pusher means for moving a stack of cartons from the magazine into a case on the platform, the pusher means acting in response to the total height of a stack of cartons being equal to the height of the associated case in the tower, means for ejecting a filled case from the tower and means for turning the case end-for-end and thus placing the glued flaps for each carton on the underside thereof in order to apply pressure on the glued flaps to seal them.

U.S. Pat. No. 3,584,432 discloses an automatic packaging machine for use in packaging operations in which cases of packaged product must be broken open for intermediate operations, such as tax stamping, and then repackaged into their original cases. The machine is said to be adapted to receive individual open cartons, reseal them, arrange them in stacked rows corresponding to their previous arrangement, and reinsert them into their original case. Operating adjustments are provided to enable the machine to be used interchangeably with packages and cases of varying size.

U. S. Patent No. 3,477,198 discloses a machine which is said to automatically accumulate or stack a number of cartons of cigarettes in tiers, each tier including a plurality of cartons, and packs the cartons into an empty case. The machine further includes structure for positioning a case in location for being packed with cartons. The machine disclosed in the above-mentioned patent is said to be able to accommodate cartons of cigarettes of different lengths, such as the regular, king-sized and imperial length cigarettes. The machine is not, however, capable of accommodating cigarettes of different thicknesses, such as standards and "thins." In addition, each carton of cigarettes must be turned over before it is fed into the carton accumulating mechanism.

SUMMARY OF THE INVENTION

To achieve manufacturing flexibility, a preferably portable, easily adjustable, case packing machine is needed which will enable rapid product size changes to be accommodated along a high speed production line.

The present device enables such fast size changing, allowing the device to be used for short runs of non-standard carton sizes. This flexibility saves on hand packaging of nonstandard sizes, as the machines illustrated in the prior art and commonly used are fixed as to size and shape and the production line is not easily retooled without significant effort. Further, in the event of mechanical breakdown of the larger fixed units, this small portable machine can be rapidly put into place to reduce the production losses which would otherwise be suffered in the event of a serious and prolonged interruption in packaging.

A telescoping stacking chamber, telescoping pusher plate, deflectable telescoping flap ledges, and fixed detent size position locks enable rapid adjustment without need for tools. A manual adjustment wheel interconnected to the multiple size adjustments mechanically or via electronic control enables all adjustments to be made accurately and quickly. Finally, a self-aligning spring-tensioned mouth piece assembly allows incoming packs to be handled efficiently and at high speeds. The cartons are effectively lined up along one side of the stacking chamber.

Swivel canisters allow for portability, and a single electrical-electronic control attachment enable the packer to be instantly integrated into existing machinery configured for use with the versatile case packing device.

BRIEF DESCRIPTION OF THE DRAWINGS

FIG. 10 A is a frontal view of the interdigitated telescoping pushing plate.

FIG. 10 B is a partial perspective view of the adjustable traverse rod system and pinion gear.

DETAILED DESCRIPTION

The present invention can be best understood with reference to the accompanying figures.

Figure 1:
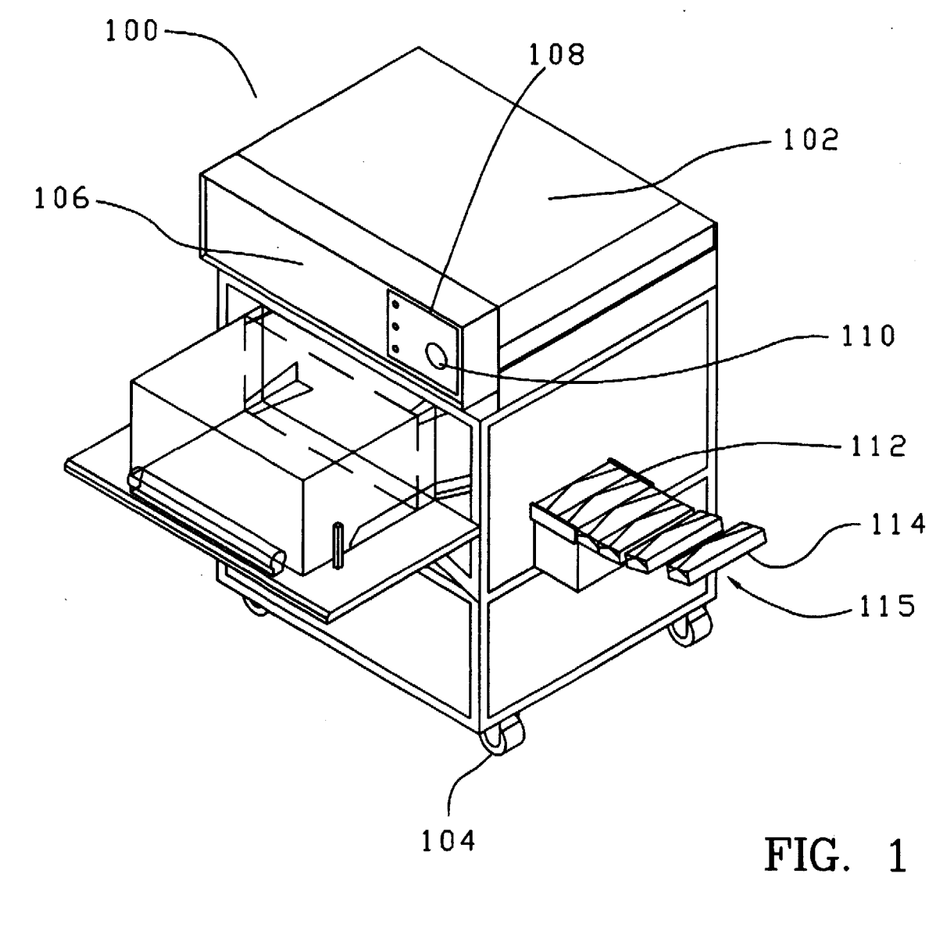
FIG. 1 is a perspective view of the exterior of a device embodying the present invention.

FIG. 1 illustrates the portable case packing device according to the present invention. The device 100 is housed in self-contained housing 102. For ease of portability, it may be mounted on casters 104, which may be freely pivoting and preferably lockable to establish a fixed position. Front panel 106 has control panel 108, which has various controls such as on/off, indicator lights giving status of operation, and size adjustment.

The size adjustment is most preferably controlled by size adjustment wheel 110, which is either mechanically linked to the adjustable portions of the machines, or is an electronic input device which allows input of the selected size.

One particularly useful feature of the device involves the self-adjusting mouthpiece 112. Product 114 is fed in the direction of arrow 115. The portable packer may be positioned at a belt from a cartoner or other packing device and receive the packaged goods for insertion into a shipping case.

A brief description of the mechanical operation of the versatile case packing device as it pertains to its position in the packaging of cigarettes is useful is most useful to understanding the invention. Cigarettes are mass produced in packed in boxes known as 'packs '. Likewise, raisins or other bulk consumer goods are packaged in small uniform boxes. These small boxes are often packaged in larger boxes for bulk purchase by a consumer who does not want to travel to a store every time a new individual small box is needed. However, the cartons of small boxes, or shrink wrapped small boxes, are impractical to handle for larger shipments, for example, those made to a convenience store or grocery store.

Figure 2:
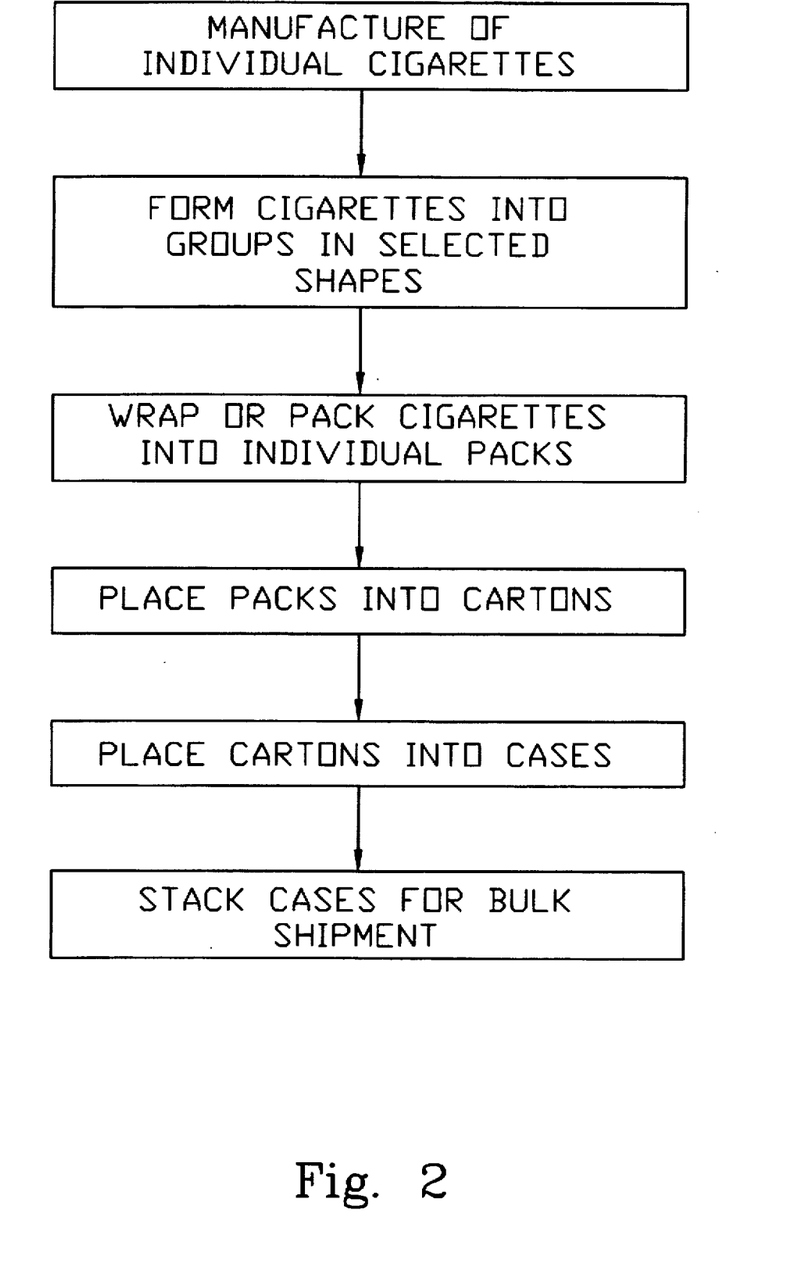
FIG. 2 is a flow chart diagram illustrating the standard production of cases of cigarettes.

Those larger amounts are usually shipped in cases, comprising anywhere from 10–100 cartons of cigarettes. For true bulk shipment, cases are usually loaded onto pallets and handled by forklift. This process flow is illustrated by FIG. 2.

The case packer is concerned with the intermediate step of taking the multiple pack carton or shrink wrapped bundle and stacking and inserting into a corrugated cardboard shipment case or the like.

Figure 3:
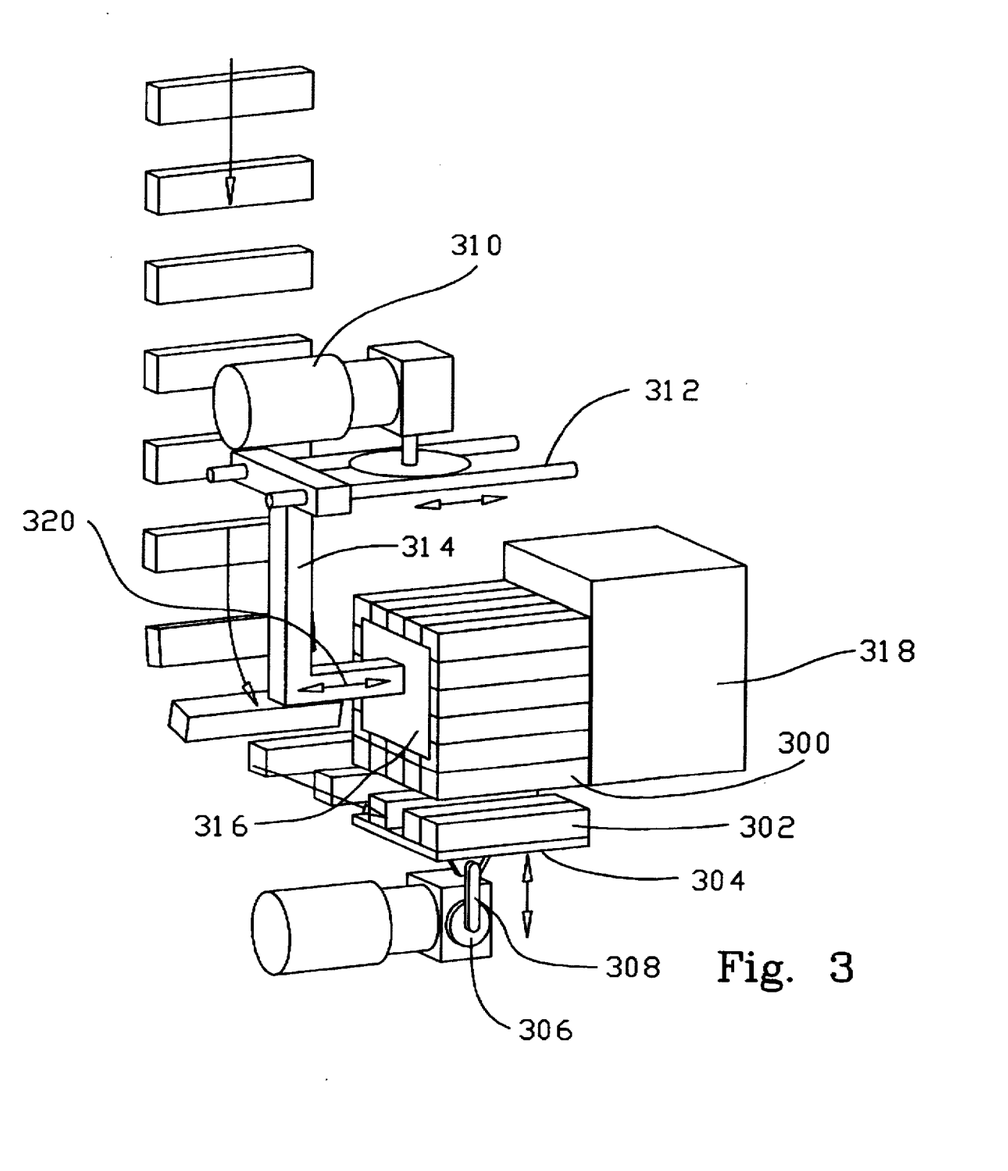
FIG. 3 is a perspective view of the flow of product through the interior of a device embodying the present invention.
Figure 5:
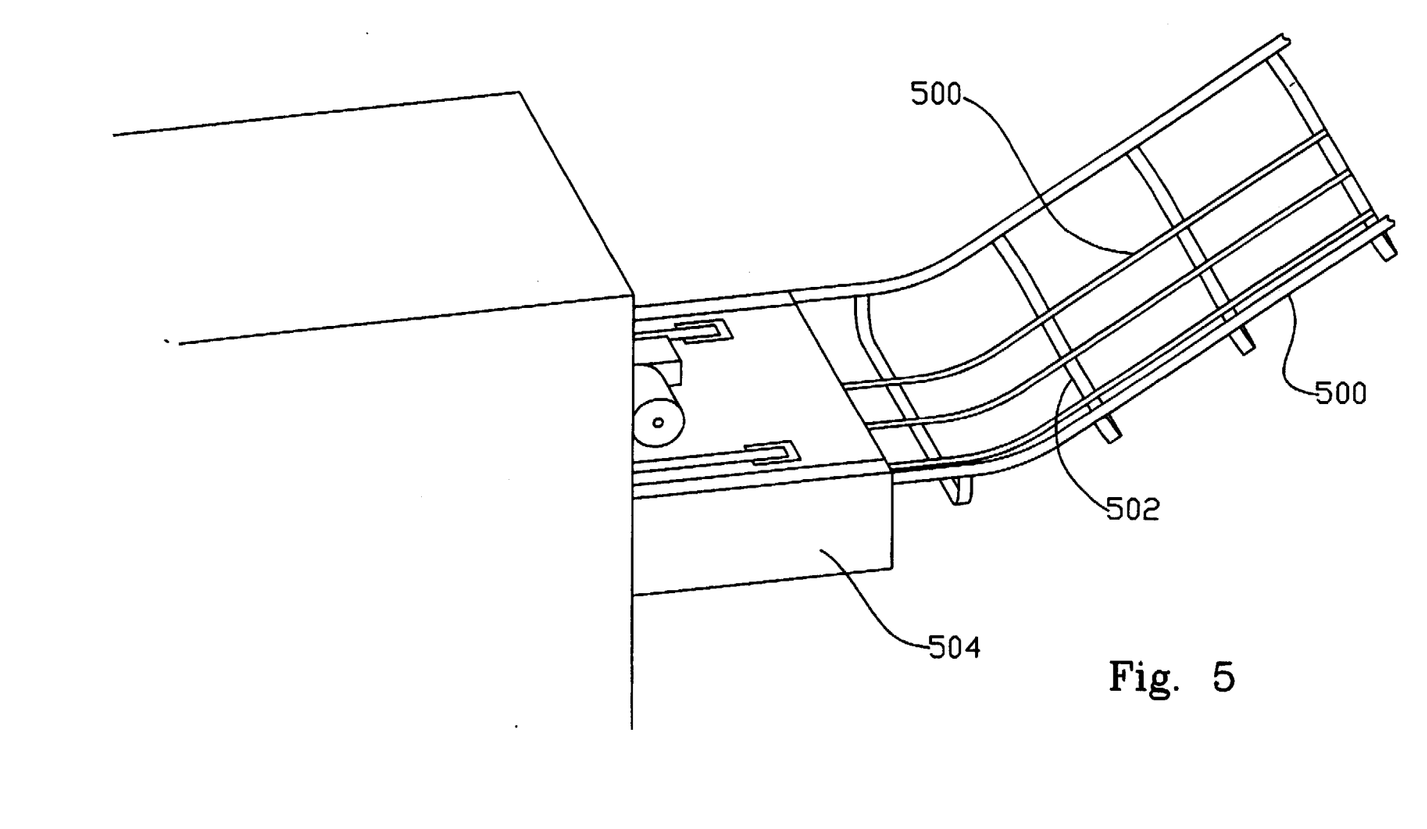
FIG. 5 is a perspective view of the product feed chute and power infeed.

As illustrated in FIG. 3, cartons of cigarettes or the like enter the portable case packer through a gravity fed chute. The cartons of cigarettes or the like are gravity dropped from the carton forming machine, e.g. a Focke 510 Cartoner, which is known in the art and a product of Focke & Co, Verdun, Germany. The cartoner exit is generally placed relatively higher than the infeed mechanism, in order that a simple chute-type conveyer may allow the cartons of cigarettes or the like to slide smoothly down into the power infeed mechanism. FIG. 5 illustrates such a chute. Preferably the longitudinal members 500 are coated with a friction reduced material, such as TEFLON®. Horizontal members 502 support the longitudinal members in spaced relation. The chute attaches by a simple tongue-groove fitting to the infeed housing 504, or may be more permanently affixed, e.g. by bolting the assembly together.

Figure 4:
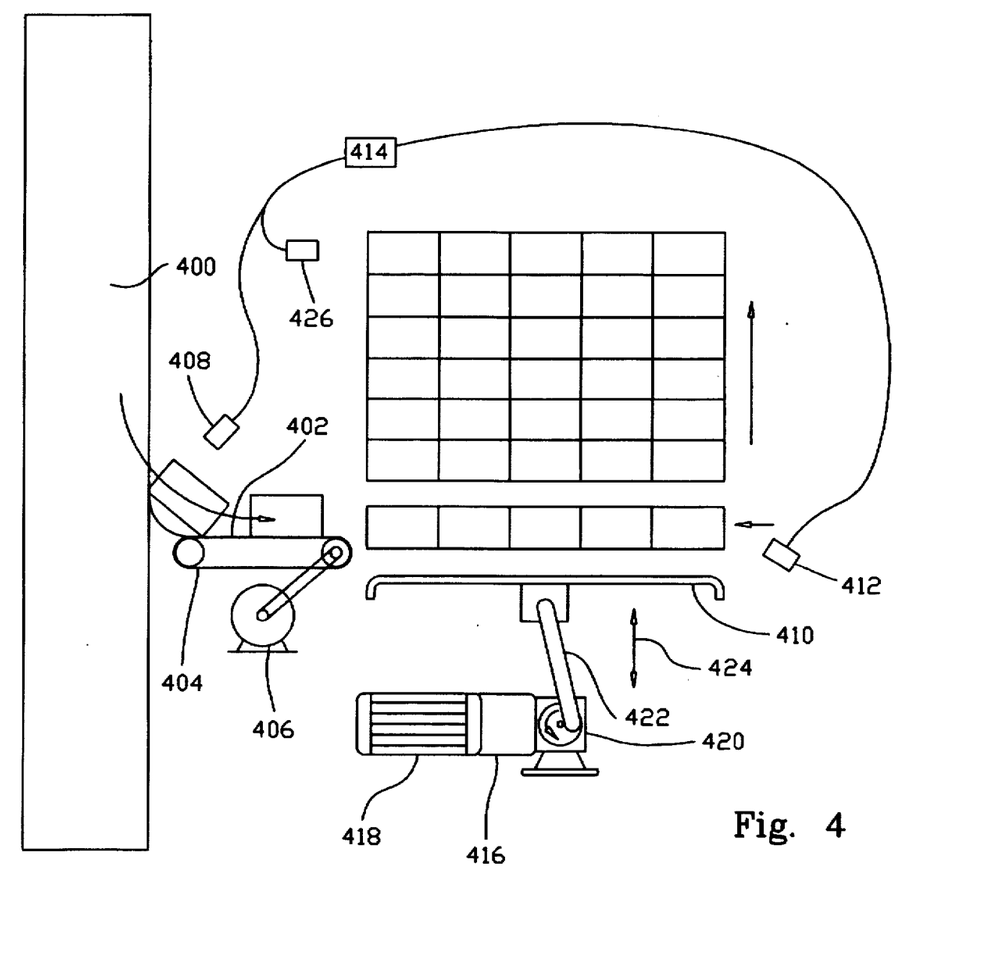
FIG. 4 is a side view of the feed and lift apparatus and product flow through a device according to the present invention.

Turning to FIG. 4, which is a side view of the mechanical operation of the versatile case packer functions, the cartons or wrapped agglomerated packages are fed from a chute 400 to the powered infeed 402. Conveyor 404 is powered by motor 406. Motor 406 may be a continuous drive motor, or controlled so as to turn only when product is being delivered, as determined by sensor 408.

The powered infeed delivers product to the stacking chamber base 410. When stacking chamber base 410 is filled, sensor 412 sends a signal to the control unit 414. Control unit 414 then engages the magnetic clutch and powers motor 418 to turn wheel 420. Wheel 420 is formed with an off-center aperture to which one end of rod 422 is pivotably mounted. Rod 422 is thence pivotably connected at its other end to stacking chamber base 410.

When the clutch is engaged and the motor powered, rod 422 causes the chamber base to travel in an up-down direction depicted by arrow 424. This causes a full layer of product to be pushed upward where it is held by retaining means (not shown). When the stacking chamber is completely full of product, sensor 426 detects this condition and control 414 actuates a pushing means (not shown) to clear the chamber, preferably in a sideways direction, into a prepositioned case. The base plate is sufficiently elevated at this point so as to have the lowermost product clear any obstructions formed by the retaining clip.

The pushing function is best illustrated with reference to FIG. 3. An almost complete case of packaged product 300 is being prepared. The final row of product 302 is lining up at the bottom, and the stacking chamber base 304 is about to be raised by the action of eccentric wheel 306 acting upon rod 308. When the case full sensor (not shown) indicates that the final row of product has been properly positioned, as controller actuates pusher motor 310. Pusher motor 310 may be an electromagnetic device (e.g. solenoid), hydraulic device, or other mechanically driven device. The motor 310 is connected by tie rods 312 to support means 314. Support 314 attaches to pusher plate 316 which pushes the product out into waiting case 318.

Figure 6:
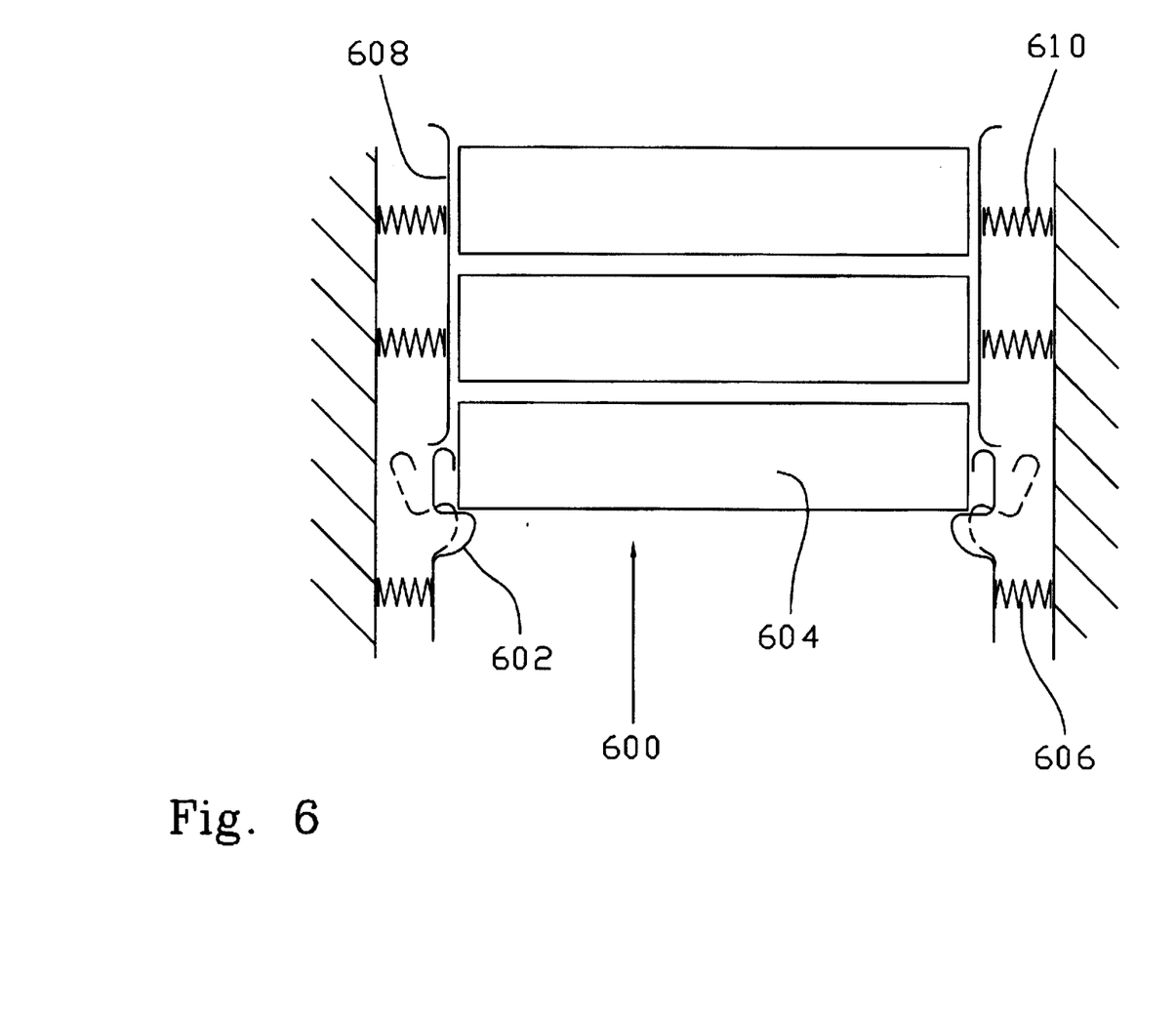
FIG. 6 is a side view of the stackinmg chamber illustrating the retaining clips and frictional engagement devices.

The stacking mechanism of the present invention is shown in a preferred embodiment in FIG. 6. The cartons of cigarettes or the like are forced upward by the action of a stacking chamber base (not shown, but illustrated by arrow 600. As the cartons pass by retaining clips 602, they deform retaining clips 602 from their standard position as shown by the dotted lines in FIG. 6. The product then passes the clips, the stacking chamber base retracts, and the clips spring back to support the lowermost row of cartons 604. The retaining clips may be formed of a flexible material, e.g. steel, stainless steel, or high impact ABS plastic or the like, with sufficient rigidity so as to flex and support the stacked product without additional assistance. The retaining clips may also be provided with springs 606 or other elastic support to assist them in rebounding into position after the stacking chamber base has retracted.

The stacked cartons may be retained in the upward position solely by the retaining clips, or auxiliary frictionally engaging sides 608 may be provided. The sides may be fixedly mounted to a support and rely on their own flexibility to provide sufficient frictional engagement; or may be mounted with springs 610. In the event frictionally engaging sides are provided, they must be positioned such as to allow the pusher assembly to push between them and eject the product from the stacking chamber into a waiting carton.

Figure 7:
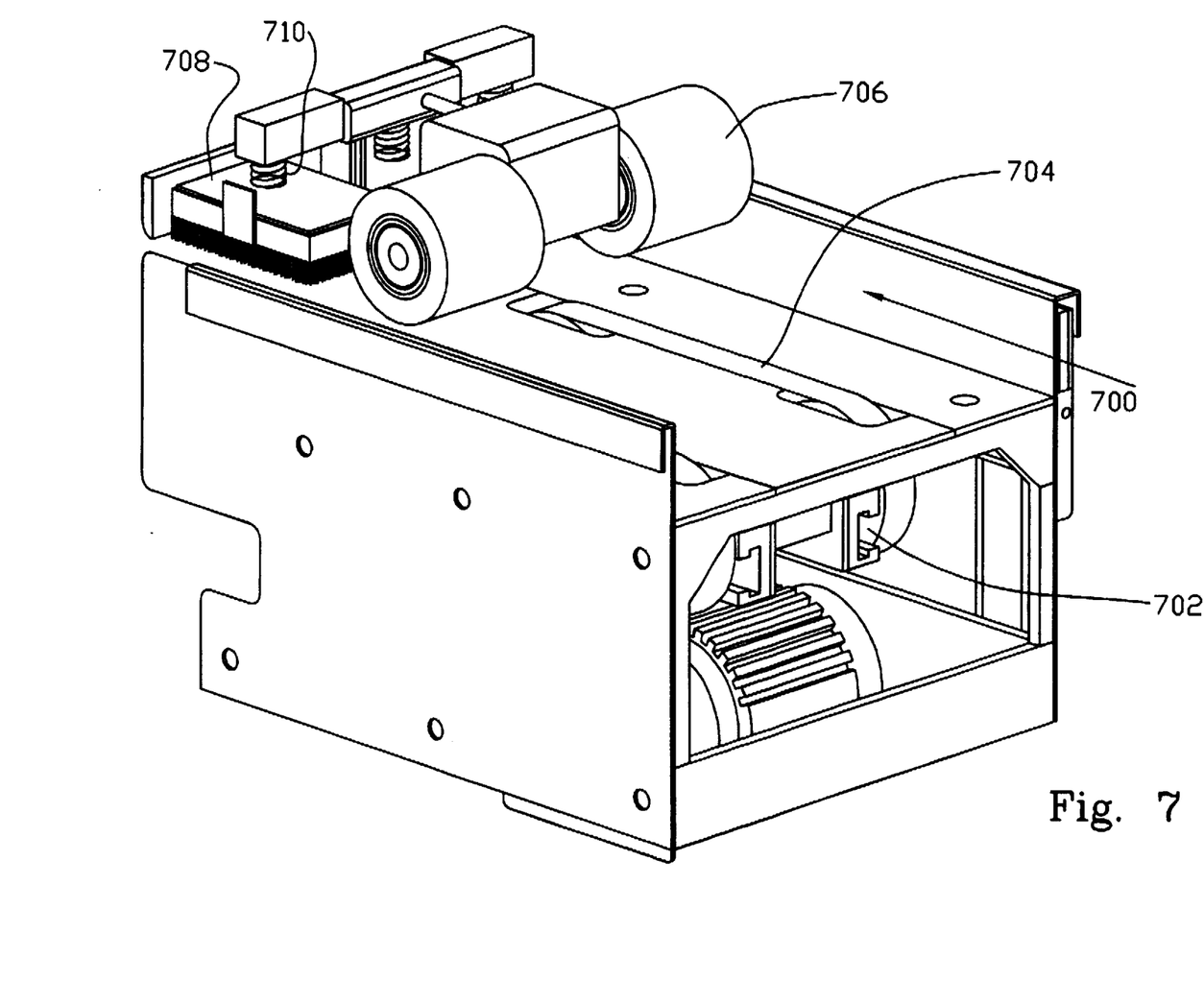
FIG. 7 is perspective detailed view of the power infeed.

Turning now to FIG. 7, a perspective view of the power infeed mechanism is there illustrated. It is noted that the direction of motion of the cartons is in the direction of arrow 700. Powered wheel 702 drives infeed belts 704. These belts may be a plurality of tandem driven belts, or a full surfaced conveyor. The belts are powered by a small motor in constant drive mode, or the motor may be linked to a sensor for detecting when a complete layer or case is filled with cigarette cartons.

The carton is brought under alignment roller or rollers 706. These rollers may have axes perpendicular to the motion of the carton, or preferably, are offset to ensure the cartons are snugged up against one wall of the power infeed. This offset is a matter of 0.5 to 10, preferably 3-7 degrees from perpendicular to apply a slight aligning force, but not enough to cause any damage to the product carton while it travels down the power infeed. As this slight edge alignment can cause some entry angle misalignment, brush or brushes 708 are held down over the path of incoming cartons by action of springs 710. The brushes act to straighten out any misalignment of the cartons as they proceed through the power infeed.

Other carton guiding means, such as a deformable chute sidewall, may also be used to align the carton edge. A flexible piece extending from one sidewall nudges the passing product into alignment with the other sidewall.

The action of the power infeed drives the cartons into the stacking chamber, onto the stacking chamber base as illustrated in FIGS. 4 and 3.

Figure 8:
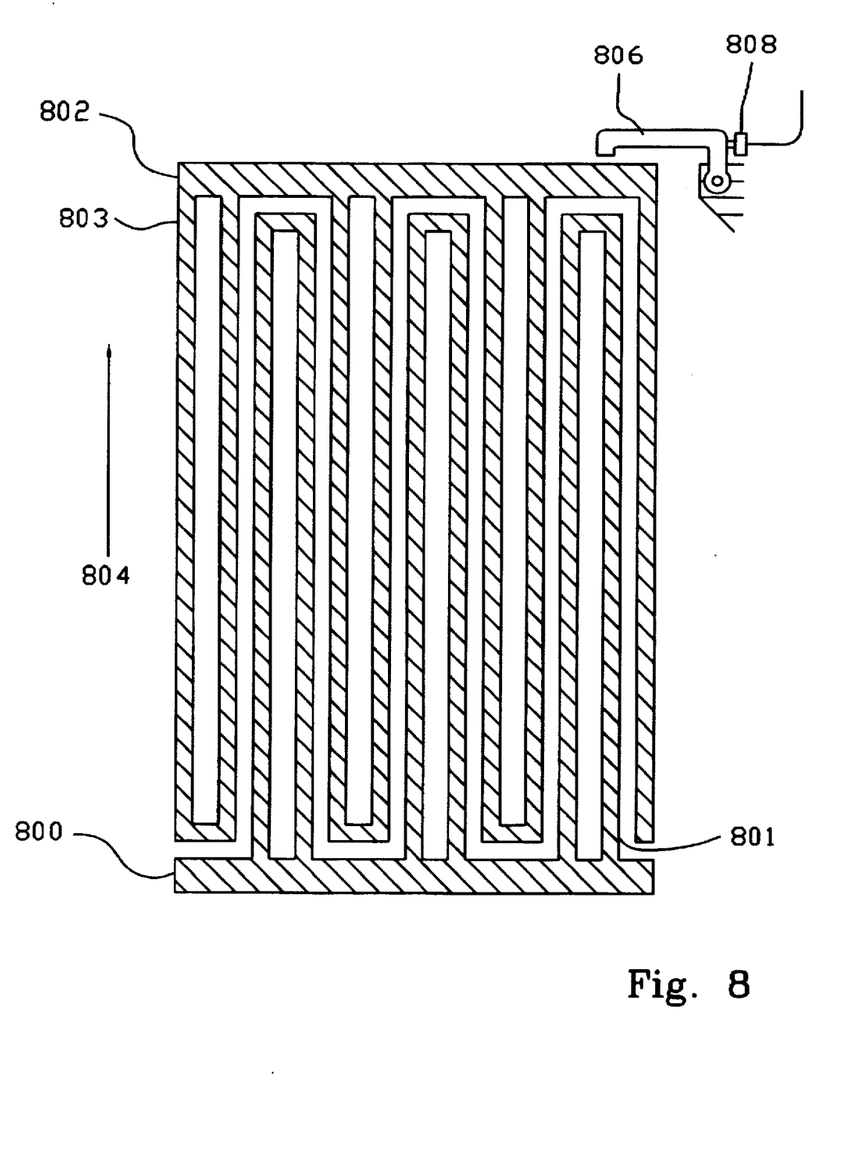
FIG. 8 is a top plan view of the interdigitated telescoping stacking chamber base members.

The size adjustable stacking chamber is one of the novel features of the present invention. In a preferred embodiment it is formed of an interdigitated base plate, as seen in FIG. 8. The first member 800 is formed with longitudinal extensions 801 and the second member 802 is formed with longitudinal extensions 803. Preferably, the longitudinal extensions are in the direction of travel of product, indicated by arrow 804. This reduces the number of contact incidences between the support members of the base plate and the incoming product, and therefore lessens the likelihood of damage to the external product wrapping.

A mechanical sensor for determining when the lowermost layer of product is filled is illustrated in FIG. 8 a sensor arm 806 is contacted by the incoming product at the end of the base. The sensor arm displaces and contacts mechanical switch 808, which sends a signal to the controller (not shown). The controller shuts down the power infeed and actuated the base plate motor which causes the layer of product to be elevated to the next plane in the stacking chamber, where it is retained by the retaining clips. The base plate then retracts, and is ready to receive the next row of product. In the event that the previous layer was the last layer for the case to be completed, the pusher arm is actuated to clear the stacking chamber.

Figure 9:
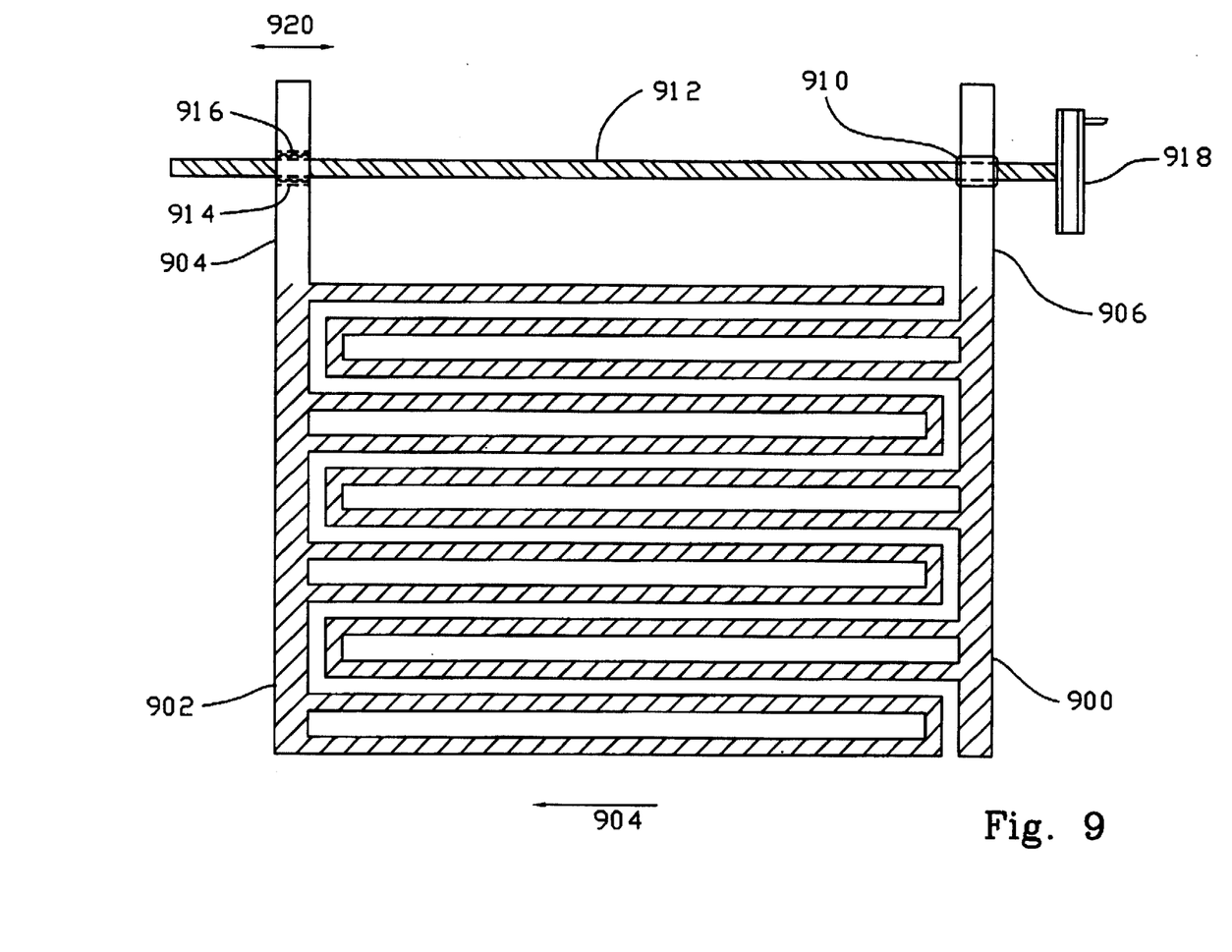
FIG. 9 is a top plan view of the interdigitated telescoping stacking chamber base members including a manual adjustment device.

The base plate is adjusted in one embodiment as illustrated in FIG. 9. The interdigitated first member 900 and second member 902 is again oriented horizontally and the longitudinal elements of the interdigitated members are in the direction 904 of product flow to reduce frictional contact. The ease of adjustment of the stacking chamber base plate size to accommodate varied product sizes is clearly illustrated here. The pusher plate elements are connected to members 904 and 906 which each are formed with openings therethrough. First opening 910 is positioned and sized such that the threaded bolt 912 passes therethrough without the threads engaging member 906.

Second opening 914 is formed with internal threads 916 which engage the threads of bolt 912. When wheel 918 is turned, the engagement of the threads causes member 904 and 902 to move in the direction(s) illustrated by arrow 920. Wheel 918 may be manually adjusted, or may be remotely controlled by a motor and sensor arrangement and controlled from a central size adjustment control.

The overall height of the chamber is easily adjusted by lifting or raising the base plate assembly to accommodate different sized cases.

Figure 10A:
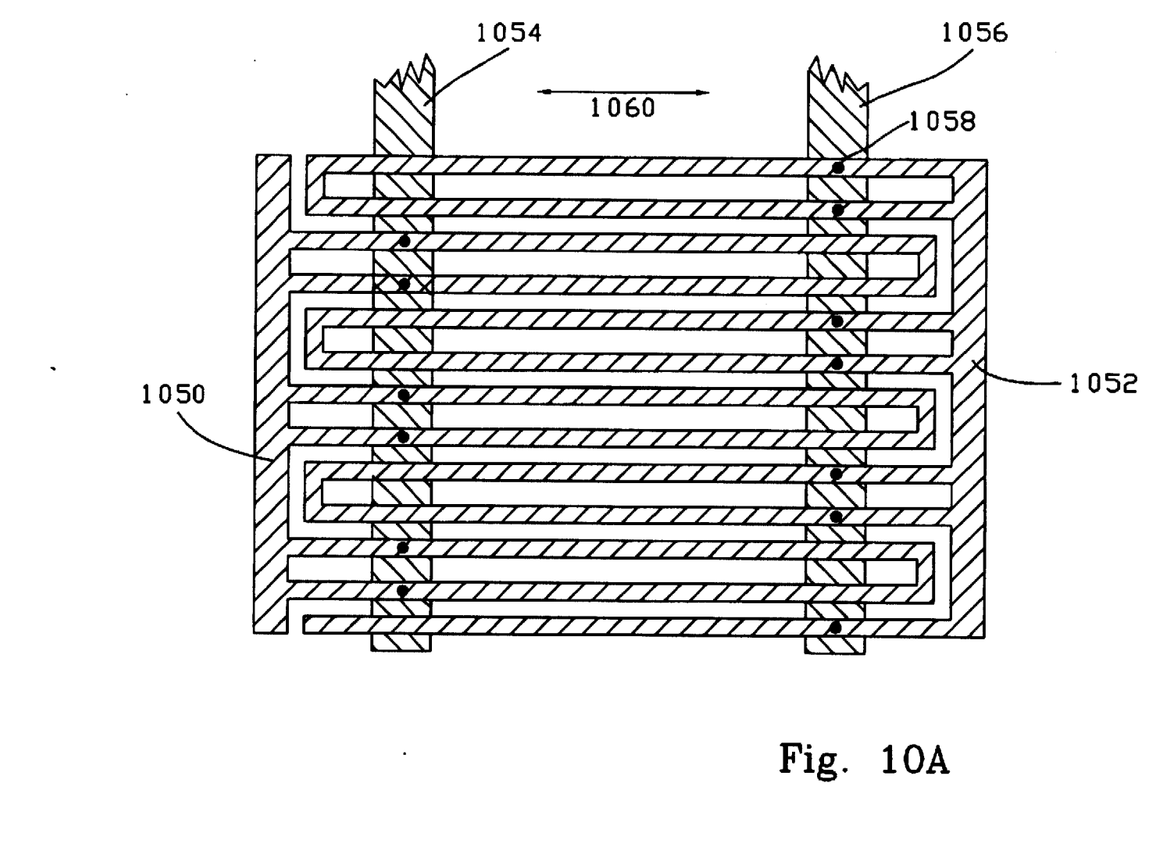

The pusher plate assembly closely resembles the base plate assembly, as illustrated in FIG. 10A and is likewise easily adjusted. First pusher plate portion 1050 has similar interdigitated members as the base plate assembly, and second pusher plate portion 1052 has corresponding interdigitated members. The respective pusher plate portions are mounted to support beams 1054 and 1056. This is accomplished by tying the pusher plate portions to only that support beam associated with it,; i.e. as illustrated by multiple points 1058, which could represent a welded joint, bolt, screw, or the like. Support beams 1054 and 1056 move relative to each other in the direction of arrow 1060.

Figure 10B:
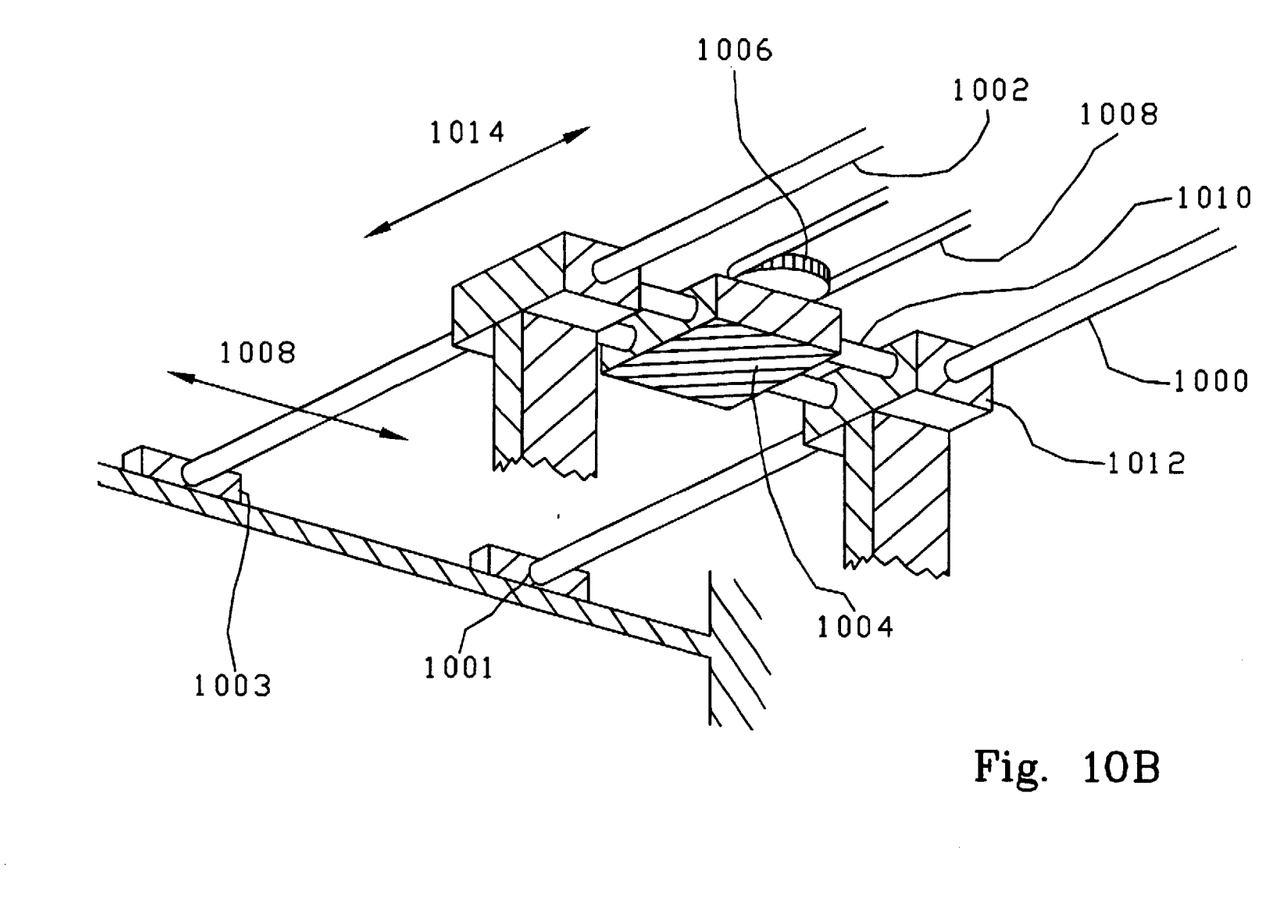

This motion is made possible by a novel traverse rod system as is illustrated in FIG. 10B. First primary traverse rod 1000 is fixed at end 1001 to the machine frame. Second primary traverse rod 1002 is slidingly engaged at end 1003 to the machine frame. Thus, the two primary traverse rods may be moved closer, or further apart. The separating or joining motion is controlled by pinion gear 1004. Pinion gear 1004 is driven by a motor linked to the controller (not shown) or a wheel 1006 turned by belt 1008. Turning this wheel 1006 causes motion in the directions of arrow 1008. Dual support beams prevent the apparatus from misalignment during adjustment, and the moving support blocks 1012 travel in the direction of arrow 1014 in the pushing motion to fill a case. Refer to FIG. 3 (which illustrates a different embodiment of the pusher device) for the pushing motion illustrated by arrow 320.

Figure 11:
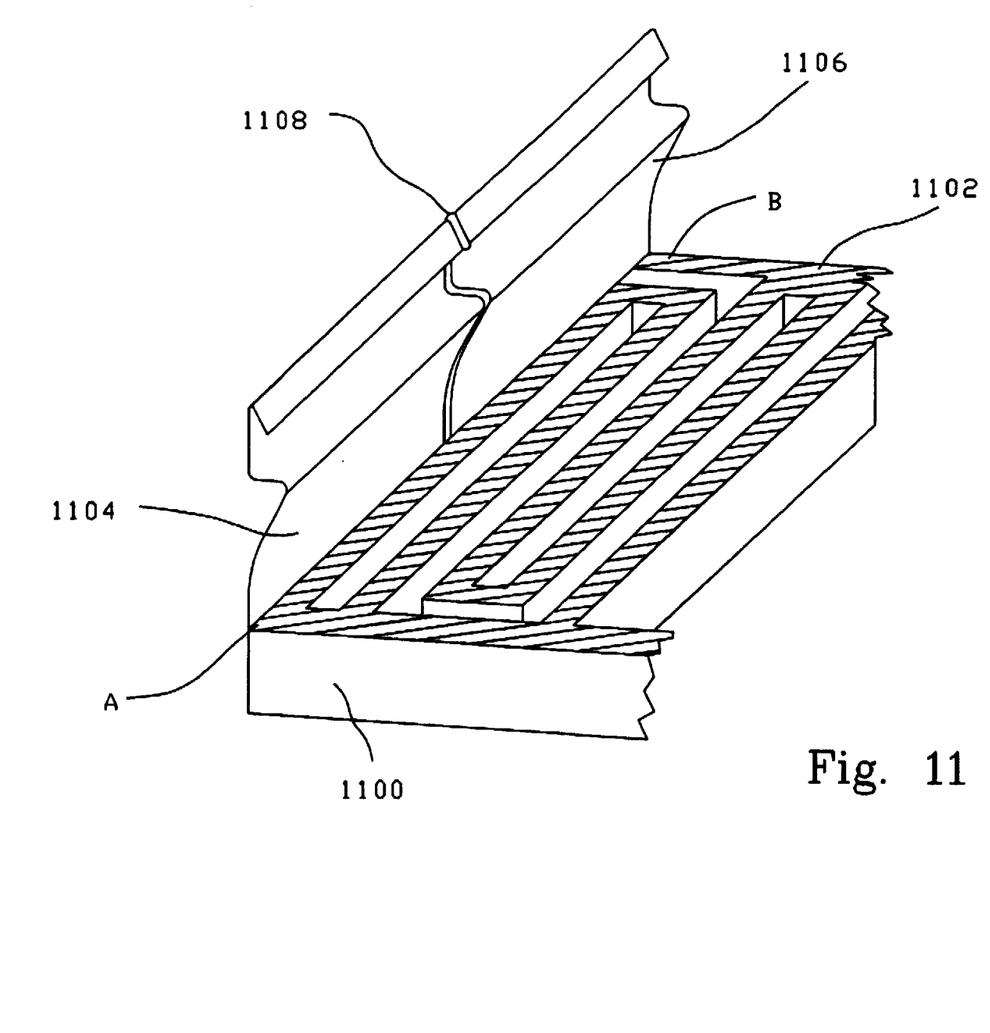
FIG. 11 is a partial perspective view of the telescoping retaining clip.

The retaining clips likewise adjust to the appropriate size stacking chamber by telescoping within each other as illustrated in FIG. 11. Stacking chamber base plate first portion 1100 is slidingly engaged with stacking chamber base plate second portion 1102. Retaining clip 1104 is associated with first portion 1100, and retaining clip 1106 is associated with second portion 1102. Retaining clip 1104 is physically connected in the horizontal direction with base portion 1100 at point A; this connection may be by bolting or the like, allowing for vertical displacement when the lift is actuated. Retaining clip 1106 is connected with base portion 1102 in a similar fashion. Thus, when the interdigitated fingers of the respective base plate portions separate, they carry the retaining clips with them, but when the base plate lifts, the retaining clips remain at their initial height. The retaining clips may also be separately adjusted by their own telescoping means.

Figure 12:
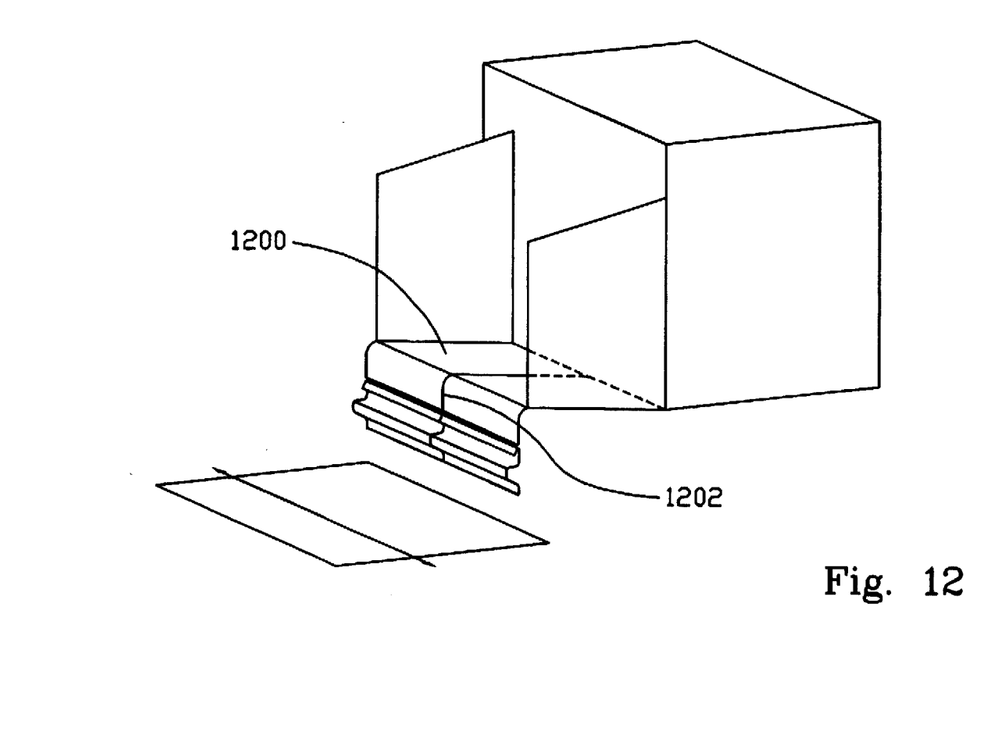
FIG. 12 is a perspective view of the exit portal and a prepositioned case.

Similarly, the outflow mouth from the versatile case packing device may be similarly adjusted. In FIG. 12, outflow mouth 1200 is formed in telescoping sections, as illustrated by seam 1202. They may be telescoped by manual adjustment, a crank as seen in the illustration in FIG. 9, or hydraulic or other means.

Adjustments on the inventive device are easily carried out by presetting the range of motion for so-called standard sizes of packaging. In a mechanical sense, this can be accomplished by providing detent points over the range of motion of various adjustments. In the electronic version, range motion sensors can be preset to appropriate distances in order that the adjustments can be made at the push of a button.

We claim:

1. An adjustable apparatus for the packaging of uniformly shaped articles into a larger container, comprising:
    an opening for receiving a stream of articles,
    a powered conveyor infeed for delivering a predetermined amount of articles from said stream into the apparatus,
    a telescoping base plate adjacent said powered infeed for receiving the predetermined amount of articles,
    a layer sensor located proximate to said telescoping base plate to determine when the predetermined amount of articles has been fed to the base plate,
    a rod connected to the telescoping base plate, said rod raising and lowering the telescoping base plate,
    opposing telescoping retaining stops having ledges above said telescoping base plate, said retaining stop ledges acting to retain any lifted articles in a raised state over the telescoping base plate,
    a telescoping push plate located adjacent to said articles in their raised state, said telescoping push plate also being slidingly mounted on adjustable rails,
    a height sensor located proximate to said telescoping push plate, said sensor to determine when a sufficient amount of raised articles are over the telescoping base plate,
    an adjustable exit portal for allowing the passage of a formed stack of articles,
    a push device for propelling the push plate towards the exit portal, and
    a controller for receiving input from the sensors, actuating the lift in response to said input, controlling the powered infeed in response to said input, and controlling the push device in response to said input.

2. An apparatus as claimed in claim 1, wherein the telescoping base plate and telescoping push plates are simultaneously adjustable.

3. An apparatus as claimed in claim 1, wherein the telescoping base plate, exit portal, telescoping retaining stops, and telescoping push plates are simultaneously adjustable.

4. An apparatus as claimed in claim 1, wherein the powered conveyor infeed comprises at least one conveyor belt, said conveyor belt being connected to a drive motor.

5. An apparatus as claimed in claim 4, wherein the drive motor is connected to a control device, and said control device is connected to the layer sensor, whereby articles are delivered by said conveyor to the base plate when it is in a lowered position and at least partially empty.

6. An apparatus as claimed in claim 1, wherein the powered conveyor infeed further comprises an alignment device for aligning the articles.

7. An apparatus as claimed in claim 6, wherein the alignment device comprises rollers mounted above the conveyor belt.

8. An apparatus as claimed in claim 6, wherein the alignment device comprises brushes located above the conveyor belt.

9. An apparatus as claimed in claim 6, wherein the alignment device comprises an alignment wall along at least one side of the conveyor.

10. An apparatus as claimed in claim 1, wherein the telescoping base plate further comprises an adjusting device for changing the area of the base plate.

11. An apparatus as claimed in claim 10, wherein the adjusting device comprises a threaded rod and at least one threaded aperture.

12. An apparatus as claimed in claim 10, wherein the adjustment is manual, and the plate members have a detent for preselected area sizes.

13. An apparatus as claimed in claim 10, wherein the adjustment is performed automatically, and directed by a central controller.

14. An apparatus as claimed in claim 1, wherein the telescoping push device is mounted on at least one rail, and slides along that rail.

15. An apparatus as claimed in claim 1, wherein the retaining stop comprises a flexible material formed with a ledge, said retaining stop being deformable when an article is lifted past the stop, and rebounding such that the ledge is underneath at least a portion of the article.

16. An apparatus as claimed in claim 15, wherein there are retaining stops on opposing sides of the base plate.

17. An apparatus as claimed in claim 1, wherein the telescoping base plate comprises two-portions and is interdigitated.

18. An apparatus as claimed in claim 1, wherein the rod connected to the telescoping base plate is pivotably connected off-center to a powered wheel.

19. An apparatus as claimed in claim 1, wherein the push plate comprises two portions and is interdigitated.

20. An adjustable apparatus for the packaging of uniformly shaped articles into a larger container, comprising:

an opening for receiving a stream of articles, a powered conveyor infeed for delivering a predetermined amount of articles from said stream into the apparatus, a two-portion interdigitated telescoping base plate adjacent said powered infeed for receiving the predetermined amount of articles, a layer sensor located proximate to said telescoping base plate to determine when the predetermined amount of articles has been fed to the base plate, a rod connected to the telescoping base plate and pivotably connected off-center to a powered wheel, said rod raising and lowering the telescoping base plate, opposing telescoping retaining stops having ledges above said telescoping base plate, said retaining stop ledges acting to retain any lifted articles in a raised state over the telescoping base plate, a two-portion interdigitated telescoping push plate located adjacent to said articles in their raised state, said telescoping push plate also being slidingly mounted on adjustable rails, a height sensor located proximate to said telescoping push plate, said sensor to determine when a sufficient amount of raised articles are over the telescoping base plate, an adjustable exit portal for allowing the passage of a formed stack of articles, a push device for propelling the push plate towards the exit portal, and a controller for receiving input from the sensors, actuating the lift in response to said input, controlling the powered infeed in response to said input, and controlling the push device in response to said input.

* * * * *